US012661774B2

(12) United States Patent　(10) Patent No.:　US 12,661,774 B2
Neumann　(45) Date of Patent:　Jun. 23, 2026

(54) CONSTRUCTION TABLE FOR PRODUCING A FILTER MODULE, AND METHOD FOR PRODUCING A FILTER MODULE

(71) Applicant: NEUFILTER GMBH, Gronau (DE)

(72) Inventor: Jens Neumann, Gronau (DE)

(73) Assignee: NEUFILTER GMBH, Gronau (DE)

( * ) Notice: Subject to any disclaimer, the term of this patent is extended or adjusted under 35 U.S.C. 154(b) by 532 days.

(21) Appl. No.: 18/279,386

(22) PCT Filed: Apr. 14, 2022

(86) PCT No.: PCT/EP2022/059995

§ 371 (c)(1),
(2) Date: Aug. 29, 2023

(87) PCT Pub. No.: WO2022/223424

PCT Pub. Date: Oct. 27, 2022

(65) Prior Publication Data

US 2024/0181623 A1　Jun. 6, 2024

(30) Foreign Application Priority Data

Apr. 21, 2021　(DE) ..................... 20 2021 102 140.3

(51) Int. Cl.
*B25H 1/02*　(2006.01)
*B01D 46/00*　(2022.01)

(52) U.S. Cl.
CPC ........... *B25H 1/02* (2013.01); *B01D 46/0001* (2013.01)

(58) Field of Classification Search
CPC ....... B25H 1/02; B01D 46/0001; B01D 46/42
See application file for complete search history.

(56) References Cited

U.S. PATENT DOCUMENTS 5,303,755 A * 4/1994 Poling .................. B25H 1/0021
144/286.5
5,890,523 A * 4/1999 Johnson ................... B25H 1/02
144/286.5

FOREIGN PATENT DOCUMENTS

CN 111037518 4/2020
CN 111037518 A * 4/2020 .............. B25H 1/02
CN 111168620 5/2020
GB 693489 7/1953

OTHER PUBLICATIONS

International Search Report of Counterpart PCT International Application No. PCT/EP2022/059995.

* cited by examiner

*Primary Examiner* — Jason L Vaughan
*Assistant Examiner* — Amanda Kreiling
(74) *Attorney, Agent, or Firm* — LIU & LIU

(57) ABSTRACT

The invention relates to a device (10), referred to as a construction table, for producing a device, referred to as a filter module, for separating particles, in particular paint particles, entrained in a raw gas stream, and to a method for producing a filter module using the construction table. The device (10) includes a work panel (14) and a support structure (22) above the work panel (14), with a cutout (16) in the work panel (14), and support rollers (20, 24) that are mounted on the support structure (22). Among the support rollers (20), a final support roller (24) is situated above the cutout (16).

10 Claims, 7 Drawing Sheets

CONSTRUCTION TABLE FOR PRODUCING A FILTER MODULE, AND METHOD FOR PRODUCING A FILTER MODULE

BACKGROUND OF THE INVENTION

1. Field of the Invention

The invention proposed here relates to the technical field of separating particles that are entrained in an air stream (raw gas stream), in particular separating paint or lacquer particles in a so-called paint mist (paint mist separation).

2. Description of Related Art

Devices for this purpose are already known, for example in the form of the filter module described in EP 2 532 409 B.

SUMMARY OF THE INVENTION

In particular, the invention proposed here relates to a device, referred to as a construction table, that is intended for producing a device, referred to as a filter module, for separating particles, in particular paint particles, that are entrained in a raw gas stream, and to a method for producing a filter module using the construction table.

The object of the proposed invention is to facilitate the production of such a, or a similar, filter module.

The above-mentioned object with regard to the device is achieved according to the invention by use of a device, referred to below as a construction table, having the features of claim 1, and with regard to the method, by use of a method having the features of the parallel method claim.

The device—the construction table—includes a work panel with a cutout in the work panel, and a support structure above the work panel, and support rollers that are mounted on the support structure, wherein among the support rollers (within the group of support rollers), a final support roller is situated above the cutout.

The special feature of the device proposed here is that at least one material web (exactly one material web or multiple material webs) may be guided over the support rollers, and the material web(s), starting from the final roller, may be guided directly into a carton placed in the cutout in the work panel. The, or each, material web and the carton are integral parts of a filter module which is producible by means of the device, and which when used as intended is produced by use of the device.

The advantage of the device is that with regard to the material webs (or a plurality of material webs) to be used, so-called rolls of material may be used in the operation, resulting in a continuous operating process, and sections of the rolls of material do not have to be taken until the particular material web is placed in the carton as intended. Thus, exactly the lengths of a material web that are actually needed are always used. Thus, no unnecessary remnants arise, and in particular, unlike for previous cutting of the material web to length, it is ensured that the material web in any case has a sufficient length.

The device proposed here also encompasses a method for producing a filter module by means of the device, and use of the device for producing a filter module. To avoid unnecessary repetitions, for the further description, features and details that are described in conjunction with the device according to the invention naturally apply, also in conjunction with and with regard to a method for producing a filter module by means of the device, and to use of the device for producing a filter module, and vice versa. Accordingly, the method may also be refined by use of individual or multiple method features that relate to the function of individual or multiple features of the device, and the device may correspondingly be refined based on features that result from the method. Consequently, features and details that are described in conjunction with the method for producing a filter module naturally apply, also in conjunction with and with regard to the device for carrying out the method and/or to the device itself which is provided for use within the scope of the method, and vice versa in each case, so that with regard to the disclosure, reciprocal reference always is or may be made to the individual aspects of the proposed invention.

Advantageous embodiments of the invention are the subject matter of the subclaims. Back-references that are used within the claims refer to the further development of the subject matter of the referenced claim via the features of the respective dependent claim. They are not to be construed as a waiver of the attainment of independent subject matter protection for the features or feature combinations of a dependent claim. Furthermore, with regard to an interpretation of the claims and an interpretation of the description, in the event of a more precise specification of a feature in a dependent claim, it is to be assumed that there is no such limitation in the respective preceding claims or in a more general embodiment of the device/the method according to the invention. Accordingly, any reference in the description to aspects of dependent claims is expressly to be construed, without specific reference, as a description of optional features.

In one advantageous embodiment, the device, in particular as an integral part of the support structure or at the support structure, includes a retaining structure and at least one retaining finger that is pivotable on the retaining structure. When a material web that is guided on the support rollers is pulled off, the at least one retaining finger is swiveled out and does not hinder the pulling-off operation. However, the at least one retaining finger prevents the material web from inadvertently sliding back.

In one advantageous embodiment of a device having a retaining structure and at least one retaining finger that is pivotable on the retaining structure, the at least one retaining finger is adjustable in length. Due to this adjustability, the at least one retaining finger may be adapted, for example, to different thicknesses of a material web or to different thicknesses of a plurality of material webs lying one on top of the other.

The cutout in the work panel is delimited by oppositely situated edges in each case, and by use of the cutout, a carton for a filter module with folded-down tabs may advantageously be accommodated, with the edges of the cutout holding the tabs of the carton in an open position. The tabs thus do not hinder the process of producing a filter module or a method for producing a filter module.

The claims filed with the present patent application are proposed formulations without prejudice to the attainment of further patent protection. Since in particular the features of the dependent claims, with regard to the prior art on the date of priority, may form separate, independent inventions, the applicant reserves the right to make these or even further feature combinations, heretofore disclosed only in the description and/or drawings, the subject matter of independent claims or declarations of division. Moreover, the features of the dependent claims may also include separate inventions that are independent from the subject matter of the respective referenced claims.

One exemplary embodiment of the invention is explained in greater detail below with reference to the drawings. Corresponding subject matter or elements is/are provided with the same reference numerals in all figures.

The exemplary embodiment is not to be construed as limiting to the invention. Rather, within the scope of the present disclosure, supplements and modifications are also possible, in particular those that are apparent to those skilled in the art with regard to achieving the object of the invention, for example by combining or modifying individual features or method steps that are described generally or specifically described in connection with the description section and contained in the claims and/or the drawings, and that by use of combinable features result in new subject matter or new method steps or method step sequences.

DETAILED DESCRIPTION OF ILLUSTRATED EMBODIMENTS

Figure 1:
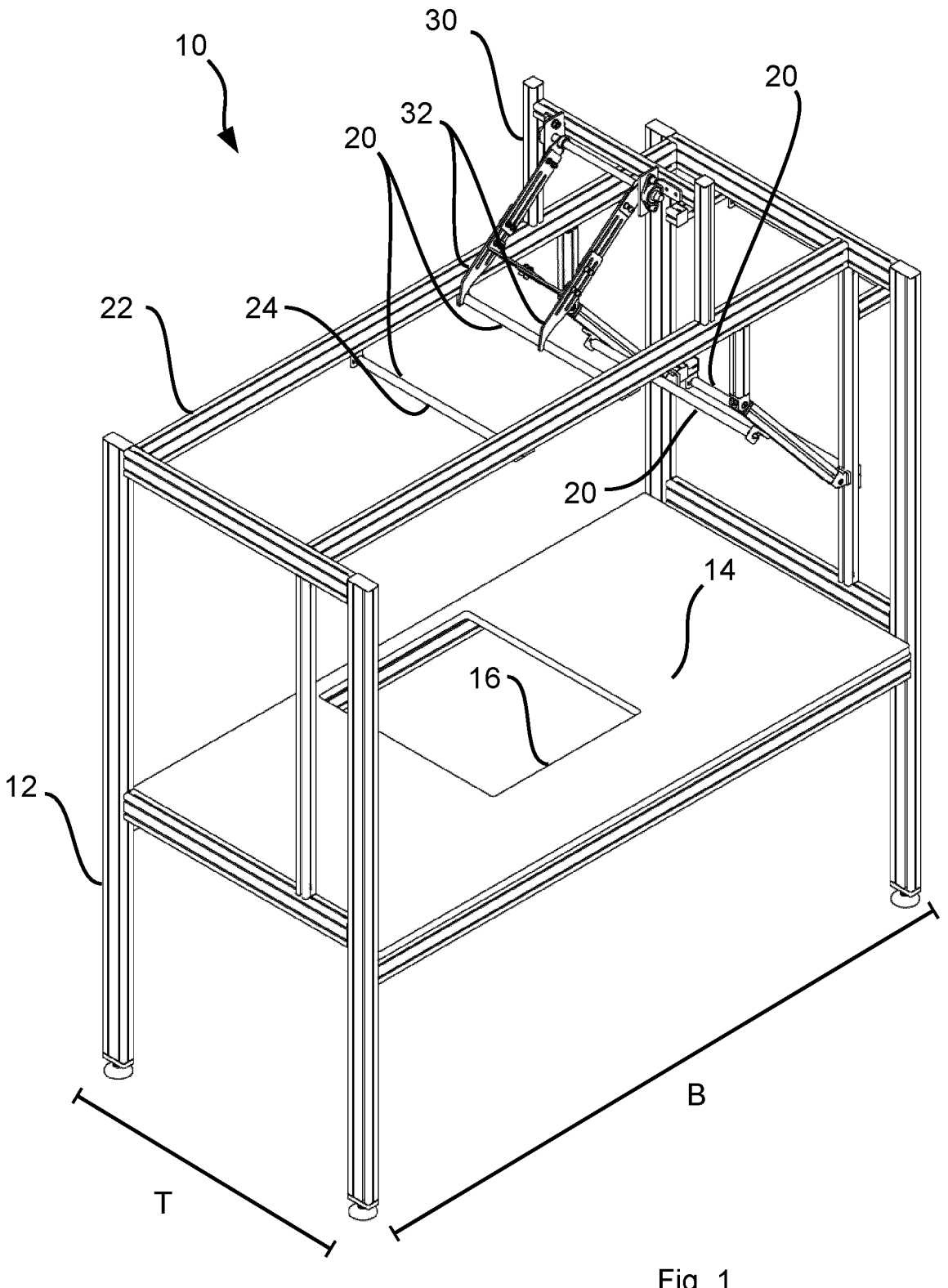
FIG. 1 shows a device ("construction table") for producing a filter module.

The illustration in FIG. 1 shows a device 10, referred to here as a construction table 10 for short, for producing a filter module, for example a filter module as described in EP 2 532 409 B or a similar filter module, in any case a filter module which in its interior has at least one web-shaped filter element and/or separation element that is turned over multiple times and that acts as a filter element and/or separation element.

In the interest of improved readability of the further description, the following discussion is continued, using the production of a module according to EP 2 532 409 B as an example. The primary features of this filter module are: a carton 40 that functions as an outer frame (FIG. 3); at least one web-shaped filter element and/or separation element that is folded over multiple times in the carton 40 and that acts as a filter element and/or separation element; and spacers between sections of the filter element and/or separation element that face one another due to the folding over.

Figure 3:
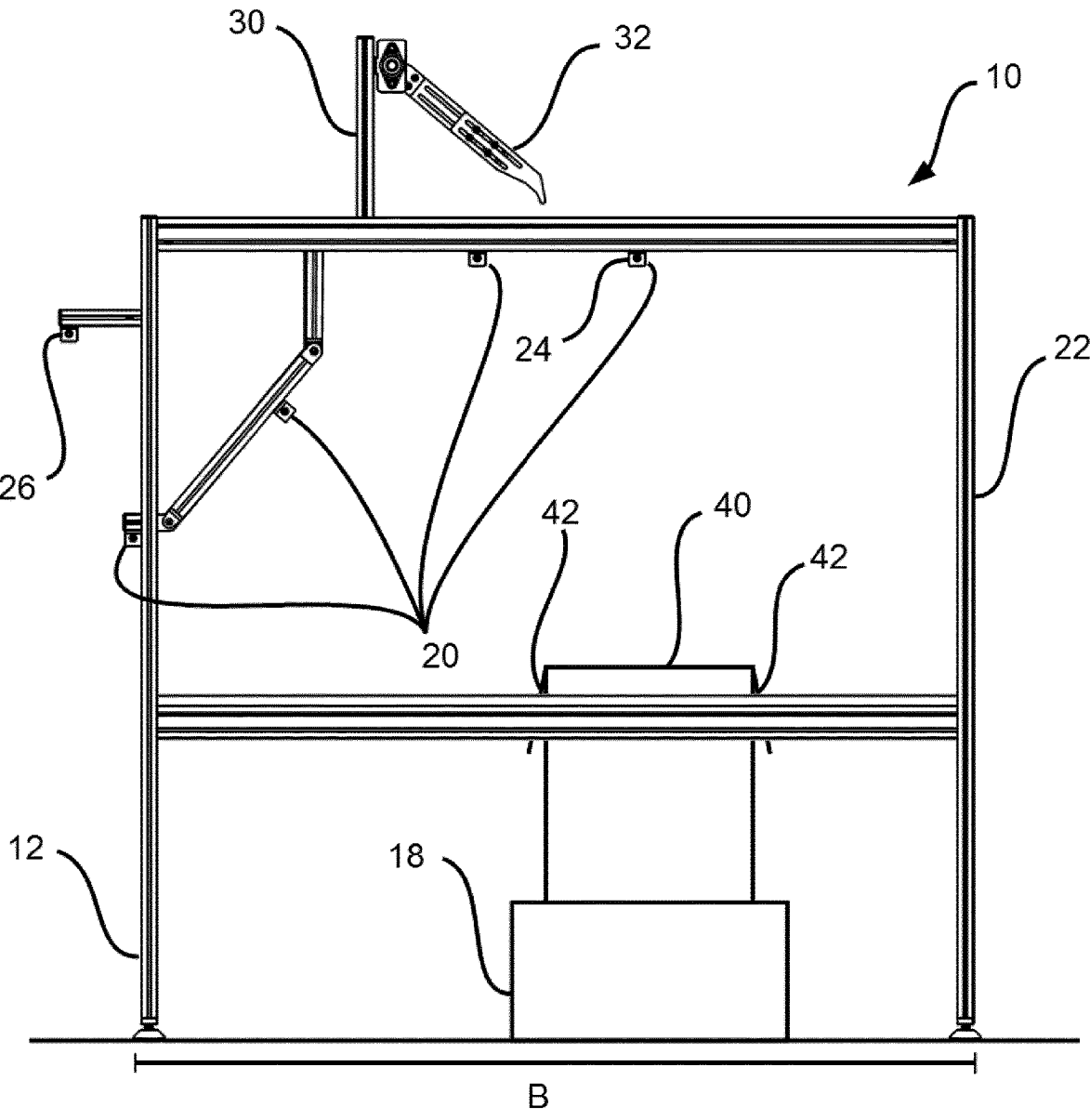

The web-shaped filter element and/or separation element is referred to below as a material web 28 for short (FIG. 3). The material web 28 is or includes, for example, a so-called multilayer paper filter as mentioned in EP 2 532 409 B. However, it is also possible to consider, for example, a synthetic filter medium or a glass fiber medium or a material web 28 that includes a synthetic filter medium and/or a glass fiber medium, as a material web 28.

The usability of the construction table 10 is expressly not limited to production of only such a filter module. Production of other, similar filter modules having at least the three features described above is also possible, and is an integral part of the invention proposed here.

This also encompasses, for example, that within the scope of the production of a filter module by means of the construction table 10, before, during, or after inserting the material web 28 into the carton 40 and placing spacers on sections of the material web 28, at least one further filter device and/or separation device is placed in the filter module.

The construction table 10, the same as a conventional table, has a standing structure or substructure 12 and a work panel 14. The standing structure 12 ensures a horizontal or at least essentially horizontal orientation of the work panel 14, and four support legs, for example, as shown.

The work panel has a cutout 16. The cutout 16 is intended for accommodating the carton 40, which functions as a frame of the filter module. Situated below the cutout 16 is a standing surface (not shown in FIGS. 1 and 2) for a carton 40 that is inserted into the cutout 16. The standing surface may be part of the construction table 10, for example in the form of a U-shaped structure whose two legs adjoin the bottom side of the work panel 14 in the region of two oppositely situated border lines of the cutout 16, and whose section that connects the two legs functions as a (flat) standing surface. The length of the legs is then coordinated with the height of the carton 40, in particular in such a way that the carton 40 placed in the cutout still protrudes, at least slightly, beyond the surface of the work panel 14. Instead of such a structure that is connected to the construction table 10, setting up a base 18 (FIG. 3) or the like beneath the work panel 14 and beneath the cutout 16 may also be considered.

The cutout 16 is oversized in relation to the external dimensions of the carton 40. The carton 40 of the filter module, the same as a conventional carton, at an open side has tabs 42 (FIG. 3), in particular exactly four tabs 42, which are folded over in a manner known per se and fixed with adhesive tape or the like when the carton 40 is closed (and here, upon completion of the production of the filter module). The tabs 42 of an open carton 40, as certainly already experienced by anyone who has filled a carton with objects, often have a hindering effect. The oversized dimensions of the cutout 16 allow the tabs 42 of the carton 40 to be inserted into the cutout 16. The tabs 42 of the carton 40 are thus fixed in the cutout 16. The opening in the carton 40, which is delimited by the tabs 42, is securely held open, and the tabs 42 do not hinder the further production process.

A material guide is part of the construction table 10. The material guide includes multiple guide elements, referred to as support rollers 20, corresponding to the embodiment shown. This preferably involves cylindrical rollers or comparable roller elements, for example multiple supported balls or the like, that are rotatable along a common axis, and individually rotatably supported and situated in parallel to one another. The guide elements/support rollers 20 with their longitudinal axis are oriented in the direction of the depth of the work panel 14 (the dimensions of width B and depth T of the construction table 10 and its work panel 14 and their directions are depicted in the illustration in FIG. 1). The support rollers 20 are held by means of a support structure 22 that functions as a material guide, and that rises above the work panel 14, and as shown but optional in principle, that may be connected to the standing structure 12, for example in such a way that parts of the standing structure 12 merge as a single piece into parts of the support structure 22.

The support structure 22 and the arrangement of the support rollers 20 in or at the support structure 22 allows a final support roller 24 from the group of support rollers 20 to be mounted above the cutout 16. During use of the construction table 10, the particular material web 28 (or multiple material webs 28) is/are guided over the support rollers 20 (all support rollers 20, including the final support roller 24).

The material web 28 (or a material web 28 in the case of multiple material webs 28) rests on all support rollers 20 during the guiding over the support rollers 20. An extension (length) of the support rollers 20, measured in the direction of their longitudinal axis, corresponds at least to the width of a material web 28 that is guided over the support rollers 20 or that is to be guided over the support rollers 20, this width being measured transverse to the web-shaped longitudinal extension of the material web 28. At least at the beginning of the process of producing a filter module, one end of the material web 28 that is guided over the support rollers 20 hangs down, in a manner of speaking, from the final support roller 24 in the direction of the cutout 16. At that location the technician may grip the end of the web, guide it into the carton 40 situated in the cutout 16, and insert it there. The support structure 22 allows sufficient room above the plane of the work panel 14 for this operation and for the further handling steps.

Upon insertion of the end of the web into the carton 40, a section of the material web 28 is laid on the base of the carton 40. In order to reach the base of the carton 40, the material web 28 may be slightly drawn over the support rollers 20 by the technician. For this purpose, the particular material web 28 is suitably stored as rolls of material or the like next to the construction table 10, for example on a rotatable drum, a roller bearing, in a trough, or the like.

A spacer is then laid on the section of the material web 28 that has been laid on the base of the carton 40 (placed in the carton 40), for example a spacer as described in EP 2 532 409 B. The next section of the material web 28 that follows is placed on the spacer subsequently present in the carton 40 (and in an orientation parallel to the plane of the base of the carton 40), and for this purpose the material web 28 is guided into the carton 40. The material web 28 may be slightly drawn over the support rollers 20 by the technician. During the laying, the direction of the course of the material web 28 in the carton 40 alternates (S-shaped course, meandering course), and the material web 28 is subsequently folded over once in the carton 40, and with the mutually facing flat sections encloses the spacer. A new spacer is then laid on the section of the material web 28 that was last guided into the carton 40, and by adjusting and pulling down the material web 28 over the support rollers 20 and folding it around the spacer and on the spacer, a new section of the material web 28 is then guided into the carton 40. This is repeated until the carton 40 is filled up to its upper edge or essentially up to its upper edge. The material web 28 is then cut through transverse to its longitudinal extension, and the portion of the material web 28 situated in the carton 40 is separated from the material web 28 still resting on the support rollers 20.

The carton 40 is subsequently closed. For this purpose, the carton 40 is lifted out from the position in the cutout 16. The tabs 42 of the carton 40 are thereby freed up. The tabs are folded over, in a manner known per se, in order to close the carton 40, and are subsequently fixed, for example, by means of adhesive tape or the like.

During production of a filter module by means of the construction table 10, an (optionally multilayer) web-shaped filter element and/or separation element (material web 28) may be guided over the support rollers 20. In the same way, in each case multiple web-shaped filter elements and/or separation elements (material webs 28) may at the same time be guided over the support rollers 20. The material webs 28 are then situated one on top of the other, and only the respective lowest material web 28 comes directly into contact with the support rollers 20. Also for multiple material webs 28, one material web 28 is guided over the support rollers 20, namely, a material web 28 from the plurality of material webs 28.

For multiple material webs 28 that are guided by means of the support structure 22, at the beginning of the production of a filter module the ends of the material web hang down from the final support roller 24 in the direction of the cutout 16 and a carton 40 placed at that location. The technician grips all ends and guides them together into the carton 40. The laying of spacers and the folding over of the material webs 28 as well as the final closing of the carton 40 take place as described above.

Figure 2:
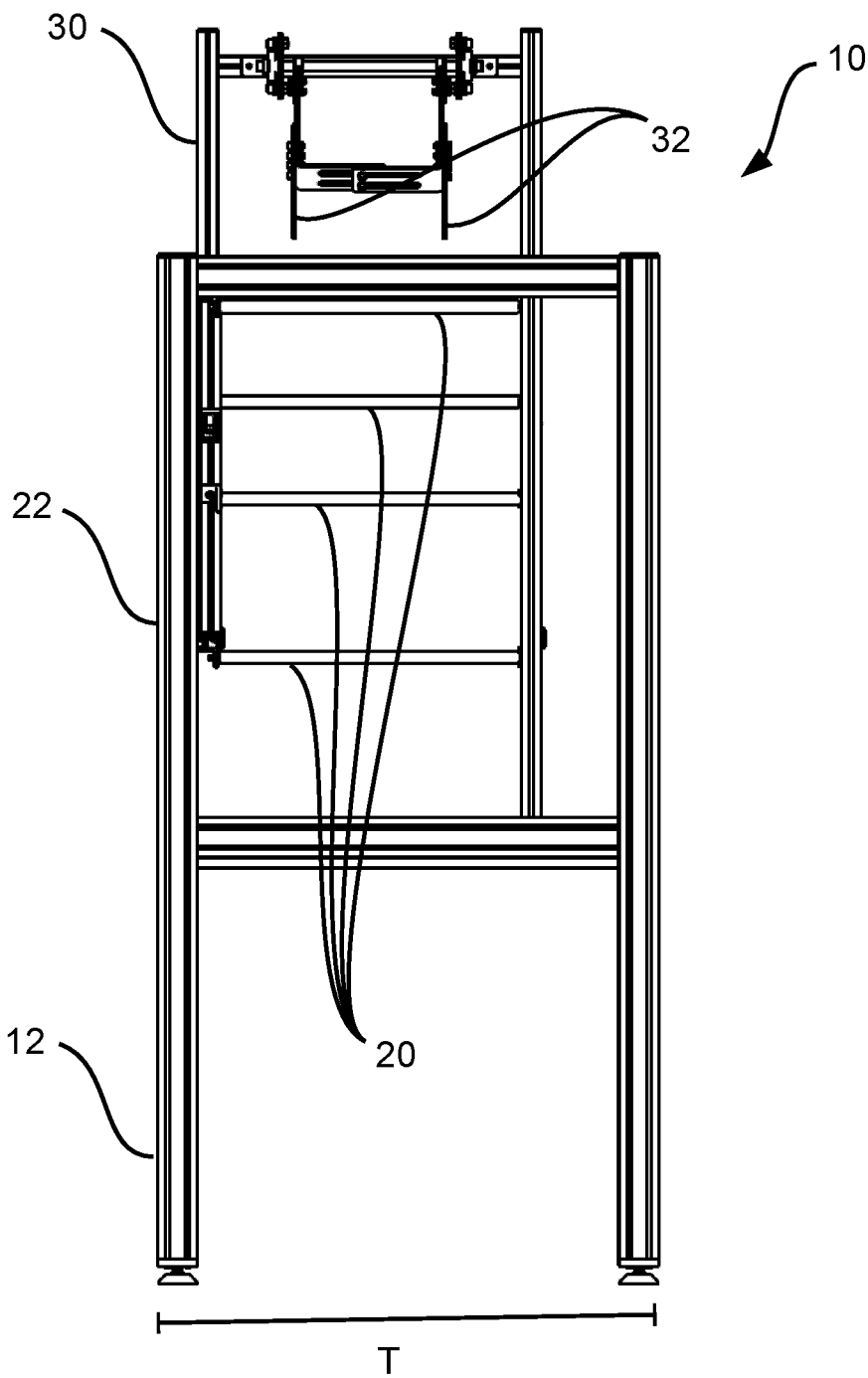
FIGS. 2 and 3 show the construction table from FIG. 1, in each case in a side view.

The illustrations in FIGS. 2 and 3 show the construction table 10 according to FIG. 1 in two different side views, namely, with a view of the side that determines the depth T of the construction table 10 in the illustration in FIG. 2, and with a view of the side that determines the width B of the construction table 10 in the illustration in FIG. 3.

The arrangement of the support rollers 20 and their sequence up to the final support roller 24 [and] the course of a material web 28 that is guided over the support rollers 20 during use of the construction table 10 are discernible in particular in the illustration in FIG. 3. The illustrations in FIGS. 4 and 5 show an example of a section of a material web 28 that is guided over the support rollers 20, including the final support roller 24.

The illustration in FIG. 3 also shows a further support roller 26 that is part of the support rollers 20 previously described, and shows how it functions as a support and guide for a material web 28. The further support roller 26 comes into consideration for initially separate guiding of material webs 28 when multiple material webs 28 are used. In this regard, the illustrations in FIGS. 4 and 5 also show an example of a section of a material web 28 that is guided over the further support roller 26, the individual support rollers 20, and the final support roller 24. In the case of only one individual material web 28, a particular path of the material web 28 over the support rollers 20, 24, 26 may be freely selected. It is important that the path always leads over the final support roller 24 above the cutout 16 in the work panel 14.

Figure 4:
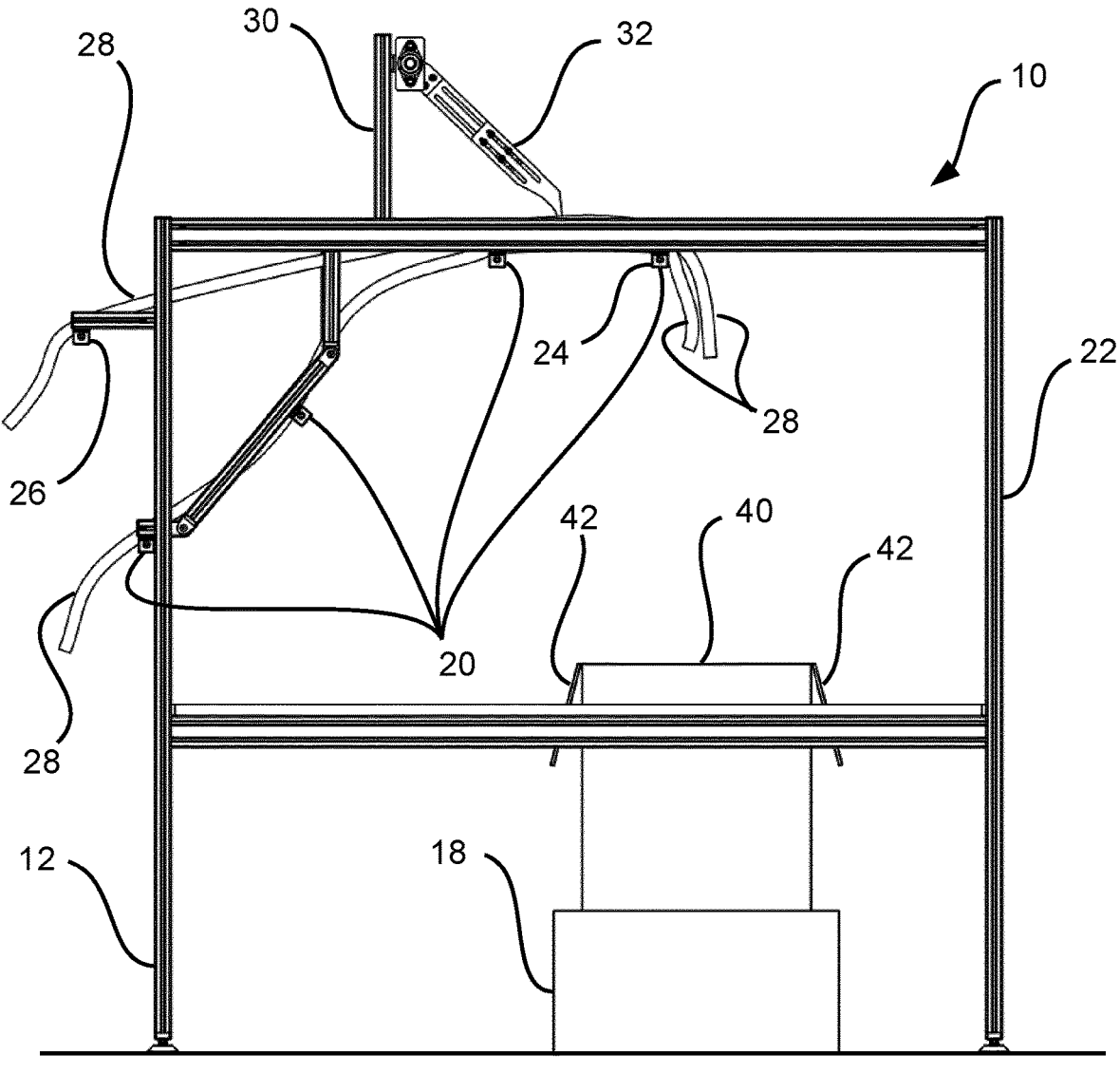
FIGS. 4 and 5 show the construction table from FIG. 1 in the side view according to FIG. 3, and with material webs in each case.
Figure 5:
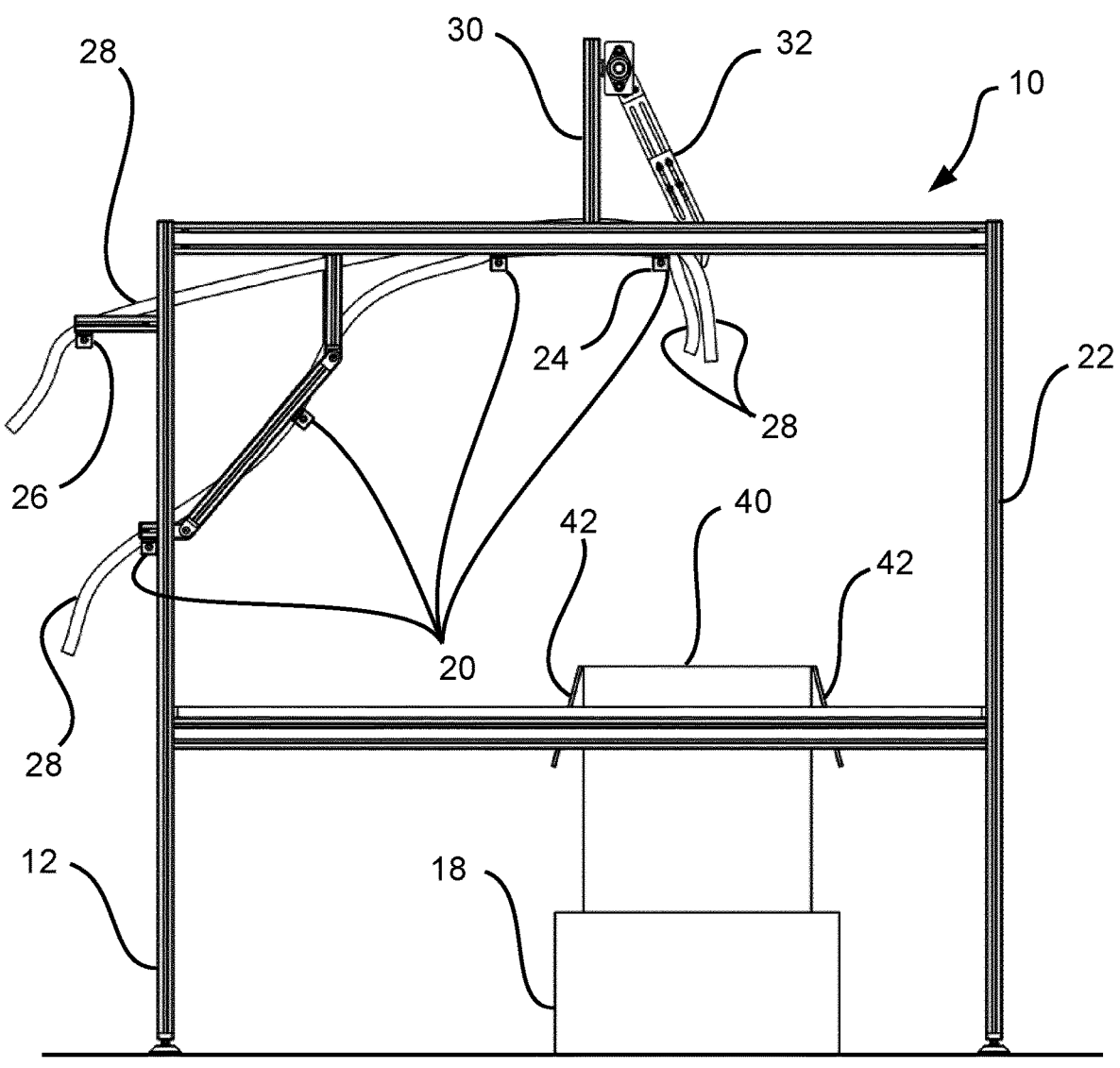

The illustration in FIGS. 3, 4, and 5 also shows, but in a greatly simplified schematic form, an open carton 40 for a filter module that is placed in the cutout 16 of the work panel 14. The carton 40 stands on a base 18; the surface of the base 18 functions as a standing surface for the carton 40. Instead of a base 18, a structure that is connected to the construction table 10, for example a U-shaped structure such as described above, and that has a standing surface for one carton 40 in each case, may also be considered. In principle, any shape of standing surface is optional for one carton 40 in each case. By use of a standing surface for one carton 40 in each case, a height of the work panel 14 that is comfortable for the work of a technician may be achieved, and an effective height of a standing surface, regardless of its design, ultimately compensates only for the height difference between the desired height (working height) of the work panel 14 and the height of the particular carton 40. A vertical clearance of the support structure 22, measured from the surface of the work panel 14, allows at least handling beneath the support structure 22 when the material web 28 is pulled off from the support rollers 20, 24, when the material web 28 is inserted into the carton 40, and when spacers or the like are placed on sections of the material web 28 in the carton 40.

The carton 40 is open at the top, and the tabs 42, which are free when the carton 40 is open and surround the opening in the carton, rest against the edges of the cutout 16 and are held by means of the cutout 16, more precisely, by means of the edges of the cutout 16. In the state in which it is held open in this way, the carton 40 advantageously protrudes least slightly (several centimeters) beyond the surface of the work panel 14, and may thus be easily gripped and moved during production of a filter module.

Figure 6:
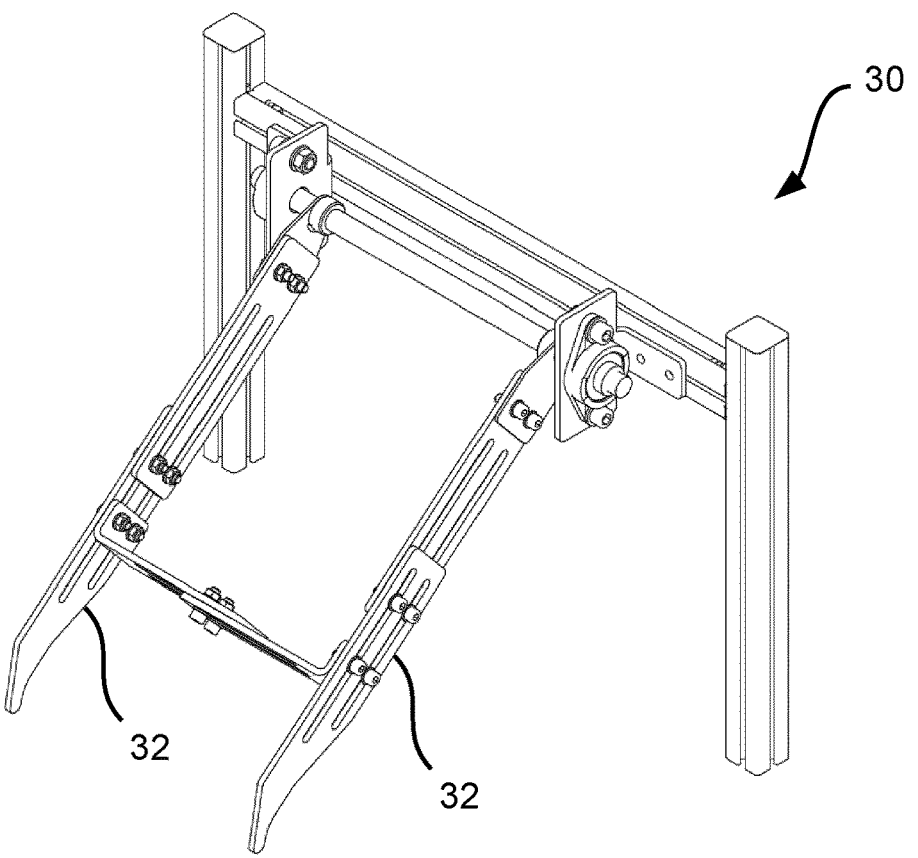
FIG. 6 shows a retaining structure of the construction table and retaining fingers that are pivotable thereon.
Figure 6:
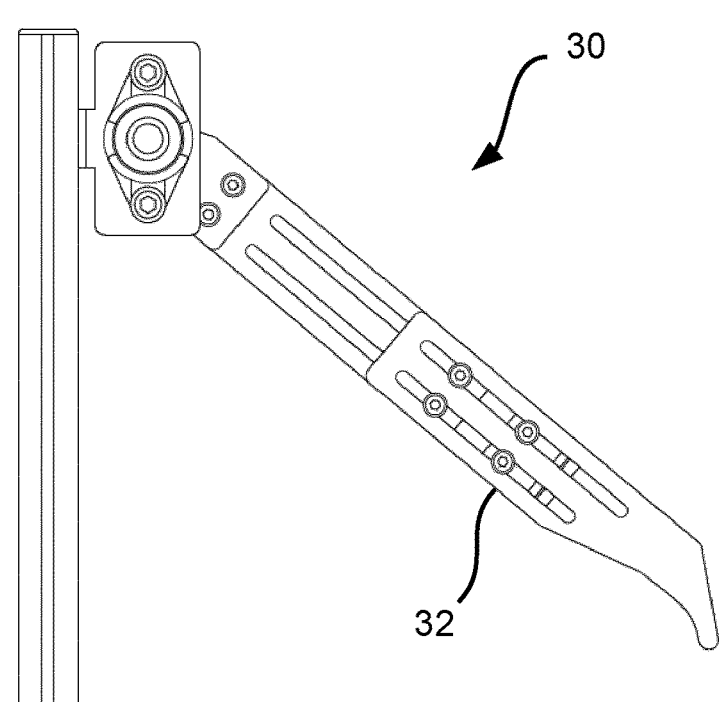

In the embodiment shown, the construction table 10, as an integral part of the support structure 22 or at the support structure 22, advantageously includes a retaining structure 30 above a plane that is defined by the final support roller 24 and the support roller 20 situated directly in front of it. The illustration in FIG. 6 shows the retaining structure 30 in an isometric view (FIG. 6, top) and in a side view (FIG. 6, bottom).

In the embodiment shown, the retaining structure 30 ends in two parallel retaining fingers 32 (instead of two retaining fingers 32, one retaining finger or also more than two retaining fingers is/are possible). The retaining fingers 32 are preferably placed symmetrically or essentially symmetrically with respect to the longitudinal axis of the support rollers 20. The retaining fingers 32 rest on the surface of the material web 28 (when only one material web 28 is guided over the support rollers 20) or on the surface of the topmost material web 28 (when multiple material webs 28 are guided over the support rollers 20) due to the weight of the material web(s) 28, and prevent the material web(s) 28 from sliding back downstream from the support rollers ("downstream from" here refers to the pull-off direction of the material web(s) 28 during production of a filter module).

The retaining structure 30 is optionally movably mounted on the support structure 22. The movable mounting means that the retaining structure 30 may be moved (displaced) on the support structure 22 in various positions. The retaining structure 30 is thus displaceable on the support structure 22 and along the support structure 22, and is fixable at the particular position. For this purpose, the support structure 22 is designed, for example (as shown), at least in sections, in the form of a profile that allows such displaceability, or includes such a profile. In other words, the support structure 22 or the relevant section of the support structure 22 and the profile at that location function as a link for the displaceability of the retaining structure 30. The illustrations in FIGS. 4 and 5 show the retaining structure 30 in different positions. In the same way that the retaining structure 30 is displaceable, it is also optionally possible for the support rollers 20, 24, 26 or at least individual support rollers 20, 24, 26 to be displaceable. The displaceability of the stated components means that their position may be adapted to the particular requirements.

The retaining fingers 32 at their ends preferably have a slightly tapered design. With this shape, the tips 34 (FIG. 7) immerge slightly into the particular material of the material web 28 or of the topmost material web 28, so that sliding back is prevented in a particularly effective manner. For a material web 28 having openings in its surface (for example, for a multilayer paper filter), the tips 34 or at least one tip 34 engage/engages in such openings, so that sliding back is likewise prevented in a particularly effective manner.

The length of the retaining fingers 32 is greater than the height of the retaining structure 30 (or the length is greater than the height of the swivel axis of the retaining fingers 32 at the retaining structure 30 above a plane of the material web 28 in the region where the retaining fingers 32 rest on the material web 28), and the retaining fingers are pivotably mounted on the retaining structure 30. With their length, which is greater in comparison to the height of the support structure, the retaining fingers 32 with their ends resting on a material web 28 are either situated at an angle to the plane of the material web 28 in the region where they rest, or reach sections of the material web 28 that are already hanging down from the final support roller 24 in the direction of the cutout 16 in the work panel 14, depending on the position of the retaining structure 30. When a material web 28 is pulled over the support rollers 20, the retaining fingers 32 swivel slightly on the retaining structure 30 and thus allow the material web 28 to be pulled off without damaging the surface of the material web 28. When the material web 28 has been pulled off, the swiveling ends, and the retaining fingers 32 drop down onto the material web 28 under gravitational influence or rest against the material web 28 under gravitational influence, and bring about the fixing of the material web 28, which prevents the material web 28 from sliding back.

In the embodiment shown, the retaining fingers 32 are adjustable in length. It is thus possible to adapt to different thicknesses of a material web 28 or different thicknesses of multiple material webs 28 that are guided one on top of the other. The adjustability of length is optional. In the embodiment shown, for purposes of adjustability of length the retaining fingers 32 have an at least two-piece design along their longitudinal extension, and these two parts 36, 38 (FIG. 7) each have elongated holes (preferably two parallel elongated holes), the two parts 36, 38 being or becoming joined together via screws or the like that are guided through the elongated holes. By changing the position of these two parts 36, 38 relative to one another, the effective length of the retaining fingers 32 may be set (for elongated holes, in an infinitely variable manner, and instead of elongated holes, along a line of adjacently positioned boreholes, corresponding to the borehole spacing).

Figure 7:
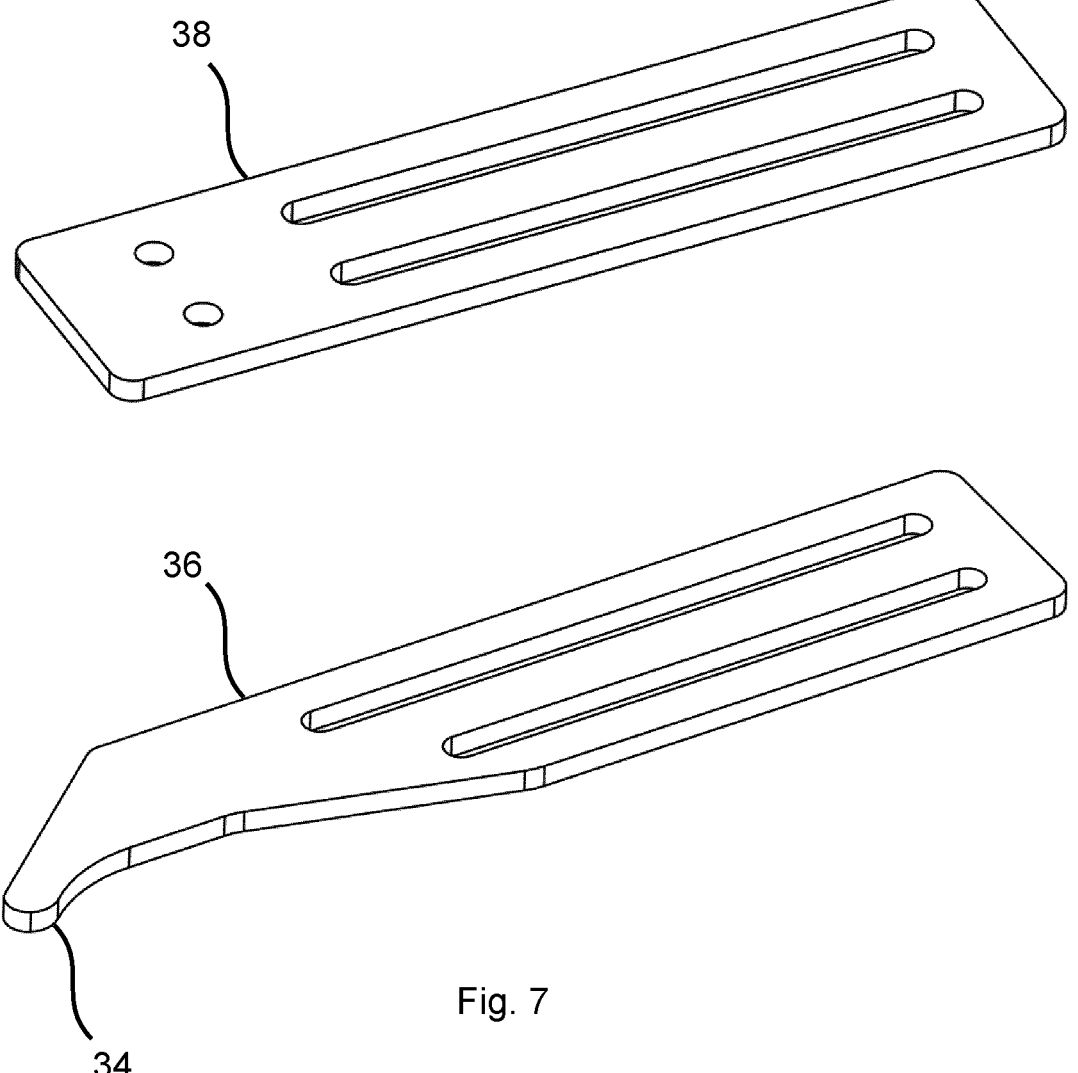
FIG. 7 shows two parts of a retaining finger.

The illustration in FIG. 7 shows the two mentioned parts 36, 38 of an at least two-piece retaining finger 32, each with two parallel elongated holes for adjusting the length in an infinitely variable manner.

Although the proposed invention has been illustrated and described in detail with reference to the exemplary embodiment, the invention is not limited to the disclosed example, and other variations may be derived therefrom by those skilled in the art without departing from the scope of protection of the invention.

Individual key aspects of the description filed here may thus be briefly summarized as follows: A device 10, referred to here as a construction table 10, for producing a device (filter module) for separating particles, in particular paint particles, entrained in a raw gas stream, and a method for producing a filter module using the construction table 10. The device 10—the construction table—includes a work panel 14 with a cutout 16 in the work panel 14, and a support structure 22 with support rollers 20 that are mounted on the support structure 22, above the work panel 14. Among the support rollers 20, a final support roller 24 is situated above the cutout 16 in the work panel. The cutout 16 in the work panel 14 is intended, during production of a filter module, for accommodating a carton 40 that functions as a frame of the filter module. Thus, the final support roller 24, with its position above the cutout 16, is also in a position above a carton 40 that is placed in the cutout 16. During the production of a filter module and for producing a filter module, at least one material web 28 is guided over the support rollers 20 (all support rollers 20, including the final support roller 24). A free end of the material web 28 hangs down, at least initially, from the final support roller 24. The material web 28 may be easily removed from a roller or the like by pulling at the free end. By pulling at the free end of the material web 28, it may be easily guided in the direction of the interior of the carton 40 and placed there. In the further process of producing the filter module, further sections of the material web 28 ("section" means no fragmentation of the material web 28) may be placed in the carton 40 by pulling at an edge of the material web 28 hanging down from the final support roller 24. When the length of the material web 28 required for producing the filter module is placed in the carton 40, the section of the material web 28 that is situated in the carton 40 is separated from the remaining section of the material web 28 still being guided over the support rollers 20.

Within the scope of a method for producing a filter module using the construction table 10, in the case of a terminating end of a material web 28, the end is connected to the start of a new material web 28. This connection takes place, for example, in the region where the material web 28 is fed, preferably at the side of the construction table 10. The connection may take place by stitching, tacking, gluing, or the like. Due to such a connection, which is repeated multiple times if necessary, the production of a filter module may take place with material webs 28 having an infinite length in a manner of speaking, resulting in an even further continuation of the operating process, and avoidance of remnants and miscuts.

LIST OF REFERENCE NUMERALS

10 device, construction table
12 standing structure, substructure
14 work panel
16 cutout (in the work panel)
18 base
20 support roller
22 support structure
24 final support roller
26 further support roller
28 material web
30 retaining structure
32 retaining finger
34 tip (at the free end of a retaining finger)
36 part (of a retaining finger)
38 part (of a retaining finger)
40 carton
42 tab (closure tab; at the carton)

The invention claimed is:

1. A device (10), comprising:
a work panel (14) and a support structure (22) above the work panel (14),
a cutout (16) in the work panel (14), and
support rollers (20, 24) mounted on the support structure (22),
wherein among the support rollers (20), a final support roller (24) is situated above the cutout (16).

2. The device (10) according to claim 1, further comprises a retaining structure (30) and at least one retaining finger (32) that is pivotable on the retaining structure (30).

3. The device (10) according to claim 2,
wherein the retaining finger (32) or at least one retaining finger (32) is adjustable in length.

4. The device (10) according to claim 1,
wherein the cutout (16) is delimited by two oppositely situated edges in each case, wherein a carton (40) with folded-down tabs (42) may be accommodated by means of the cutout (16), and
wherein the edges of the cutout (16) hold the tabs (42) of the carton (40) in an open position.

5. The device (10) according to claim 1, wherein a material web (28) is guidable over the support rollers (20), and is guidable by the final support roller (24) in the direction of the cutout (16), below the final support roller (24).

6. The device (10) according to claim 1, wherein the device (10) is intended for producing a filter module that is intended for separating particles that are entrained in a raw gas stream.

7. The device (10) according to claim 1,
wherein the device (10) is intended for producing a filter module that is intended for separating particles that are entrained in a raw gas stream,
wherein the filter module includes a carton (40) that functions as an outer frame,
wherein the filter module in the carton (40) includes at least one material web (28) that is folded over multiple times and that acts as a filter element and/or separation element, and includes spacers between sections of the material web (28) that face one another due to the folding over,
wherein during production and for producing the filter module, the at least one material web (28) is guidable over the support rollers (20) of the device (10), and is guidable by the final support roller (24) in the direction of the cutout (16), below the final support roller (24), and into the carton (40) that is placed in the cutout (16).

8. The device (10) according to claim 1,
wherein the device (10) is intended for producing a filter module that is intended for separating particles that are entrained in a raw gas stream,
wherein the filter module includes a carton (40) that functions as an outer frame,
wherein the filter module in the carton (40) includes at least one material web (28) that is folded over multiple times and that acts as a filter element and/or separation element, and includes spacers between sections of the material web (28) that face one another due to the folding over,
wherein during production and for producing the filter module, the at least one material web (28) is guidable over the support rollers (20) of the device (10), and
wherein the retaining structure (30), via the at least one retaining finger (32) that is pivotable thereon, is intended and configured to prevent the material web (28) that is guided over the support rollers (20) of the device (10) from sliding back.

9. A method for producing a filter module by means of a device (10) according to claim 1,
wherein the filter module includes a carton (40) that functions as an outer frame,
wherein the filter module in the carton (40), as a result of the production process, includes at least one material web (28) that is folded over multiple times and that acts as a filter element and/or separation element, and includes spacers between sections of the material web (28) that face one another due to the folding over,
wherein during production and for producing the filter module, the at least one material web (28) is guided over the support rollers (20) of the device (10), and is guided by the final support roller (24) in the direction of the cutout (16), below the final support roller (24), and into the carton (40) that is placed in the cutout (16).

10. The method according to claim 9, wherein the length of a length-adjustable, pivotable retaining finger (32), namely, a retaining finger (32) that is pivotable on a retaining structure (30), is adjusted to prevent the material web (28) that is guided over the support rollers (20) of the device (10) from sliding back.

\* \* \* \* \*